July 9, 1963

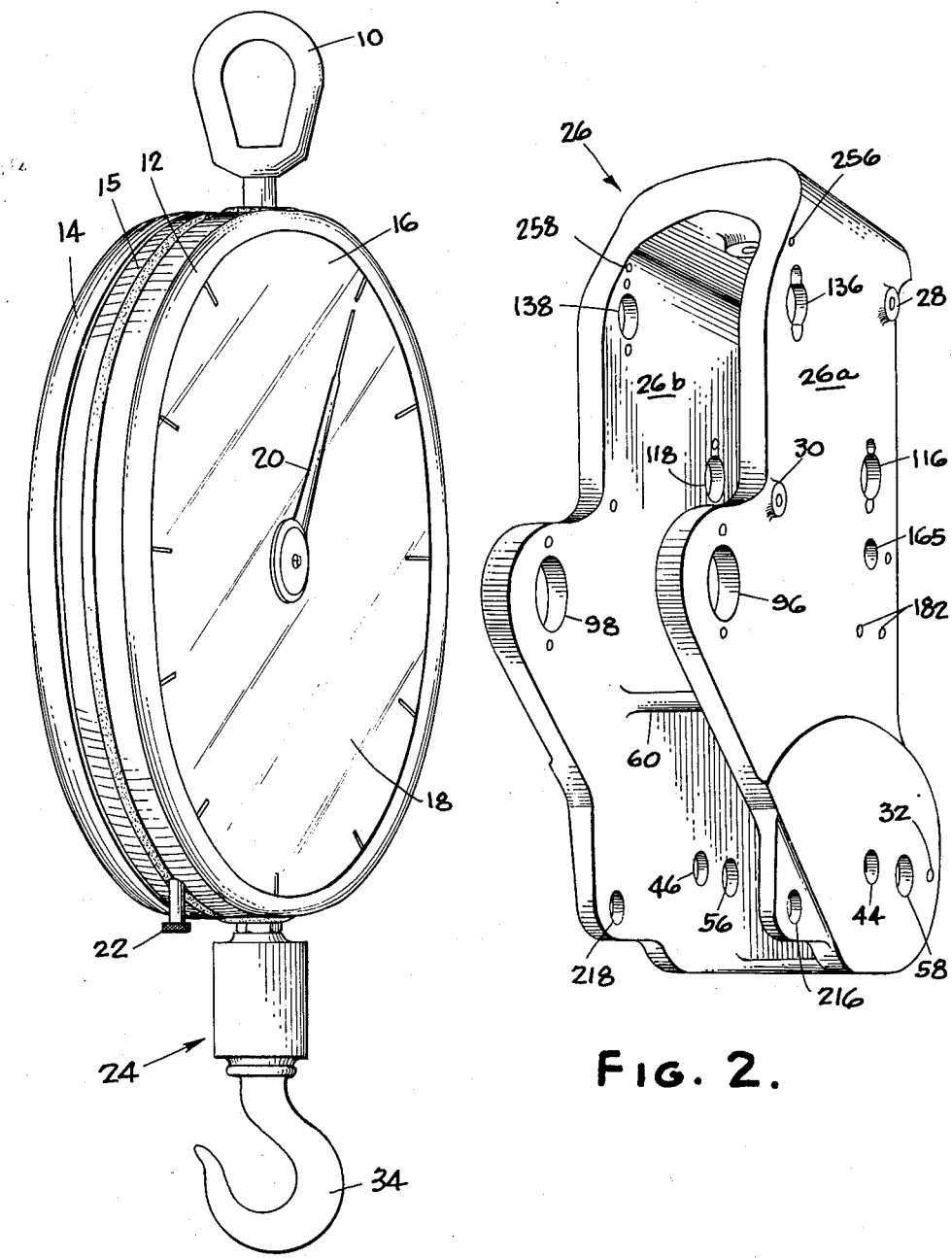

M. VAN MASTRIGT 3,096,839

WEIGHING SCALE

Filed Aug. 5, 1959

INVENTOR.
MAX VAN MASTRIGT
BY Elliott & Pastoriza
ATTORNEYS.

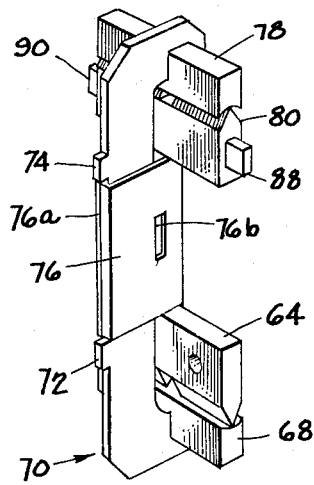
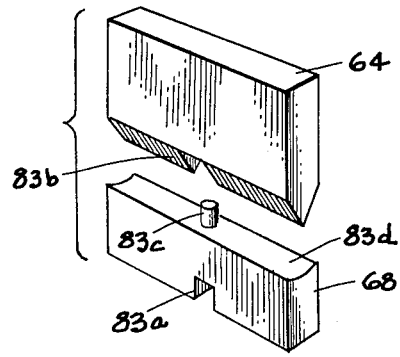
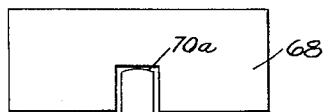
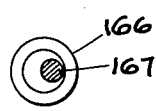
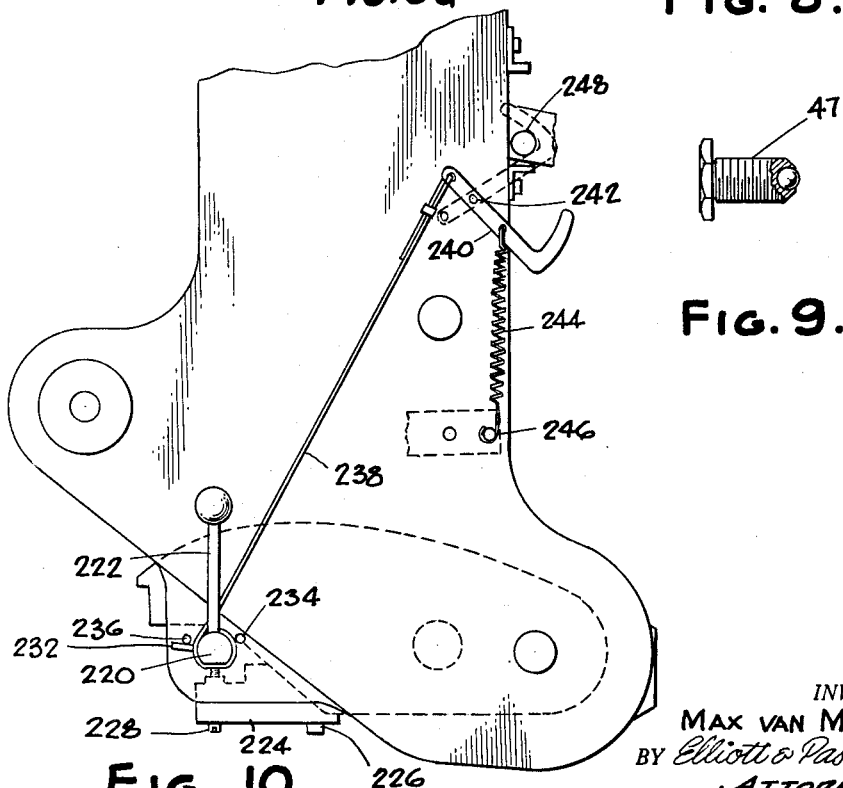

United States Patent Office 3,096,839
Patented July 9, 1963

1

3,096,839
WEIGHING SCALE
Max van Mastrigt, Van Nuys, Calif., assignor to W. C. Dillon & Company, Inc., a corporation of California
Filed Aug. 5, 1959, Ser. No. 831,739
6 Claims. (Cl. 177—156)

This invention relates generally to a weighing scale, and more particularly concerns a weighing scale primarily constructed for overhead suspension, which may be readily adapted for accurate weighing of loads in diverse industrial and commercial applications.

The primary object of the present invention is to provide a simple, ruggedly constructed weighing scale having an accuracy of that of laboratory instruments, and yet which may conveniently be adjusted to meet relatively extreme variations in required load carying capacity.

Another object of the present invention is to provide a weighing scale which embodies a construction preventing the possibility of inadvertent overloading, and yet which may be conveniently locked when not in use in order to prevent possible damage to the movable parts therein.

Another object of the present invention is to provide a weighing scale which may be readily adjusted to correct and compensate for manufacturing tolerances as well as to meet varying load capacity measuring requirements.

Another object of the present invention is to provide a weighing scale which may be conveniently manually adjusted to correct for tare loads.

Another object of the present invention is to provide a weighing scale characterized by relatively frictionless and self-aligning movable parts, and furthermore which is characterized by a relatively constant proportional movement between incremental load increases and pointer travel such that the dial may be graduated equally about its entire circumference.

Another object of the present invention is to provide a weighing scale which has a relatively light mass such that it is readily portable by one individual.

A further object of the present invention is to provide a weighing scale which may be produced relatively economically and in which many of the same parts are used throughout the scale.

Still another object of the present invention is to provide a weighing scale occupying a relatively small space, and yet which is constructed so as to reduce the load to a degree capable of accurate and precise measurement thereof by the scale indicating or pointer means.

These and other objects and advantages of the present invention are generally achieved by providing in a weighing scale a frame having suspension means coupled thereto, whereby the frame may be hung from a hook or the like overhead. The scale, according to the present invention, further includes indicating means which are journaled in the frame, and a plurality of levers intercoupled in series one to the other with the levers additionally being in pivoted coupled relationship, respectively, to the frame.

Load carrying means are suspended from the first in series of the levers. The load carrying means is preferably provided with a hook or the like for connecting with the given load to be weighed. Spring means are coupled between the frame and the last in series of the levers with the spring means biasing the last in series of the levers against movement responsive to the load.

An arm depends from the last in series of the levers, and the arm has a portion thereof designed for driving engagement with the indicating means journaled in the frame as heretofore mentioned. Force means are coupled to the arm portion biasing the arm portion into driving engagement with the indicating means.

2

As an important feature of the present invention, the levers are intercoupled by C-shaped members adapted to cooperate with opposing self-aligning knife edges secured to successive lever members.

In addition, means are provided for precise adjustment of the position of the depending arm relative to the pivot point of the last in series of the levers as well as for accurate control of the tension imposed by the spring means.

As another feature of the present invention, auxiliary spring means are intercoupled between the last in series of said levers and the frame with the auxiliary spring means being designed and positioned such as to counterbalance the unbalanced weight of said last in series of said levers with respect to the fulcrum point thereof. The auxiliary spring means are further positioned and constructed in such a manner that under load conditions, the auxiliary spring means will continue to maintain a relatively constant counterbalancing force regardless of elongation of the main spring means.

Further features and elements of the present invention will be apparent and more clear as the specification proceeds.

Towards this end, a better understanding of the improved weighing scale of the present invention will be had by reference to the drawings showing merely an illustrative preferred embodiment thereof, and in which:

FIGURE 1 is a perspective view of the weighing scale according to the present invention;

FIGURE 2 is an enlarged perspective view of the frame embodied within the scale of FIGURE 1;

FIGURE 6 is an enlarged perspective view of the coupling means employed to intercouple levers used on the weighing scale of the present invention;

FIGURE 6a is a somewhat enlarged edge view of bearing 68 and link 70 indicating the cooperation between the lever link and the bearing member;

FIGURE 7 is an enlarged, exploded view of the knife and bearing means employed in conjunction with the coupling means of FIGURE 6;

FIGURE 8 is an enlarged view of the eccentric roller employed in guiding the movement of the rack means engaging the indicating means;

FIGURE 9 is an enlarged view of the screw means limiting lateral movement of the lever member from which the load is suspended; and, FIGURE 10 is a view illustrating the operation of the means for locking the scale when it is disposed in a nonoperative position.

Figure 3:
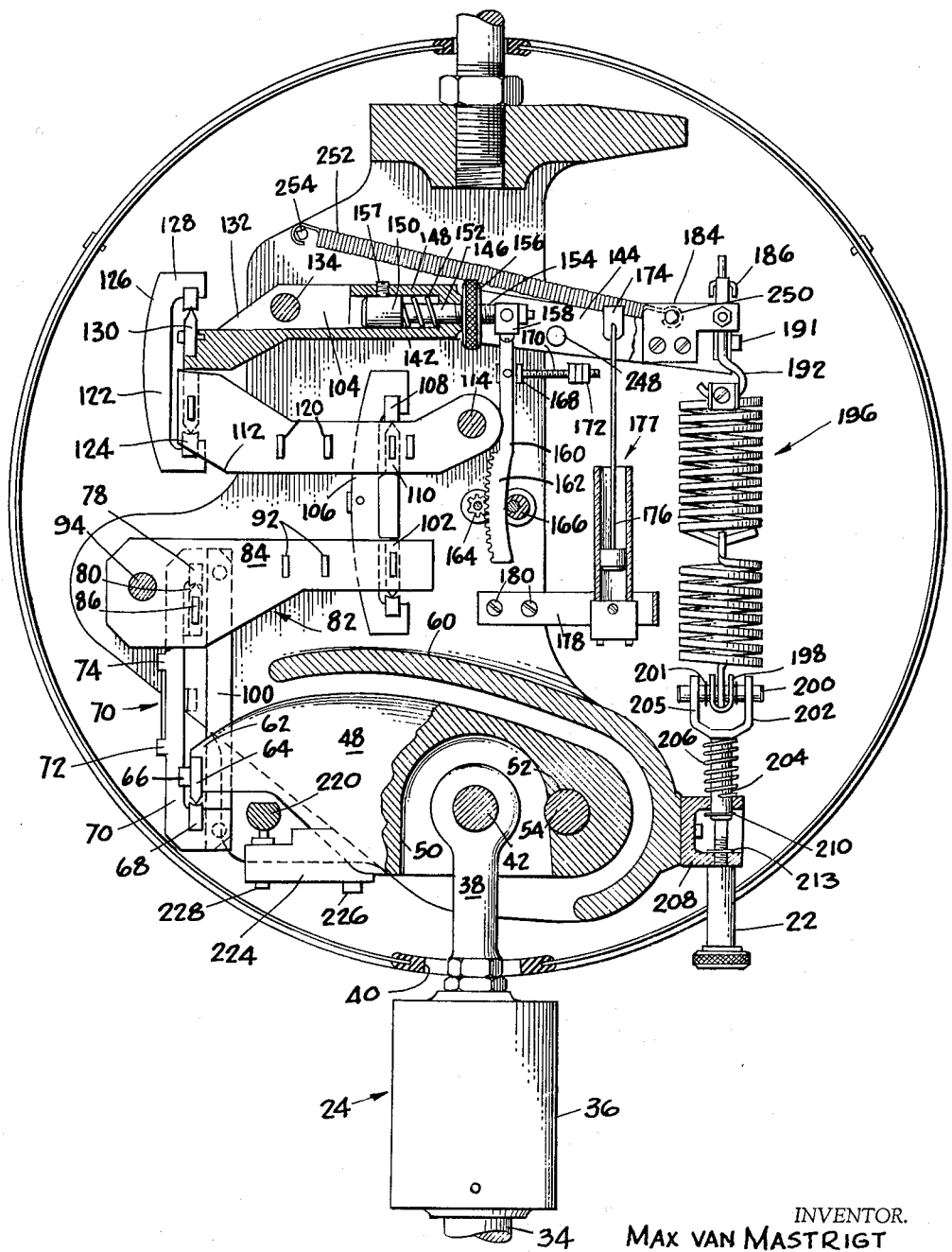
FIGURE 3 is a sectional view through the weighing scale of FIGURE 1, and more particularly approximately through the center of the frame thereof shown in FIGURE 2.

Referring now to the drawings, there is shown in FIGURE 1 an improved weighing scale according to the present invention which embodies a lifting eye 10, which may suspend the scale from a hook (not shown) coupled to some type of supporting structure or apparatus, for example, a crane or the like. The lifting eye 10 has its shank end coupled to the scale unit as such in between the front casing 12 and a rear casing 14. The front casing 12 and rear casing 14 are, in turn, intercoupled by an annular rubber sealing member 15 through a tongue and groove construction for effectively sealing off the inner portions of the scale structure from moisture, dirt, and other contaminants from the atmosphere.

Figure 4:
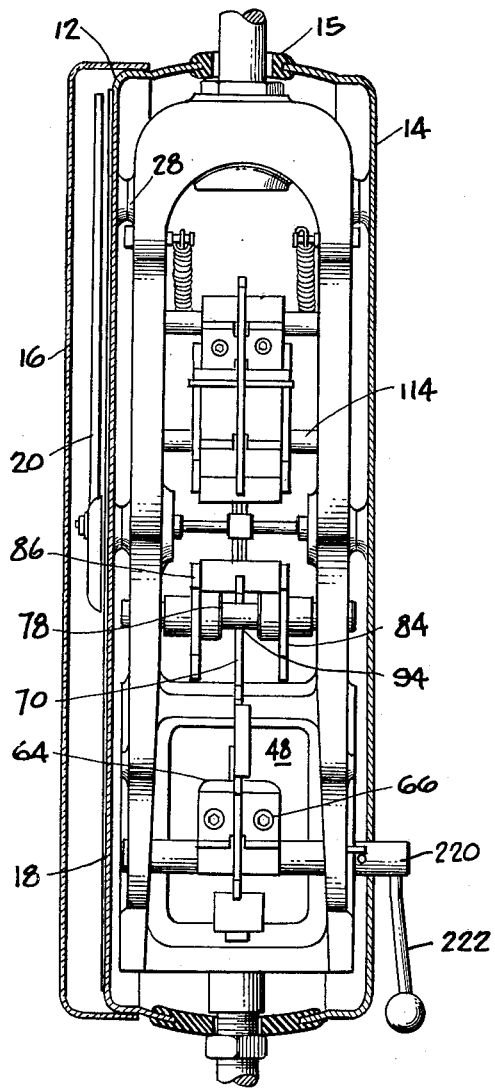
FIGURE 4 is a side elevational view of the weighing scale of FIGURE 1 taken from inside the covering structure thereof.
Figure 5:
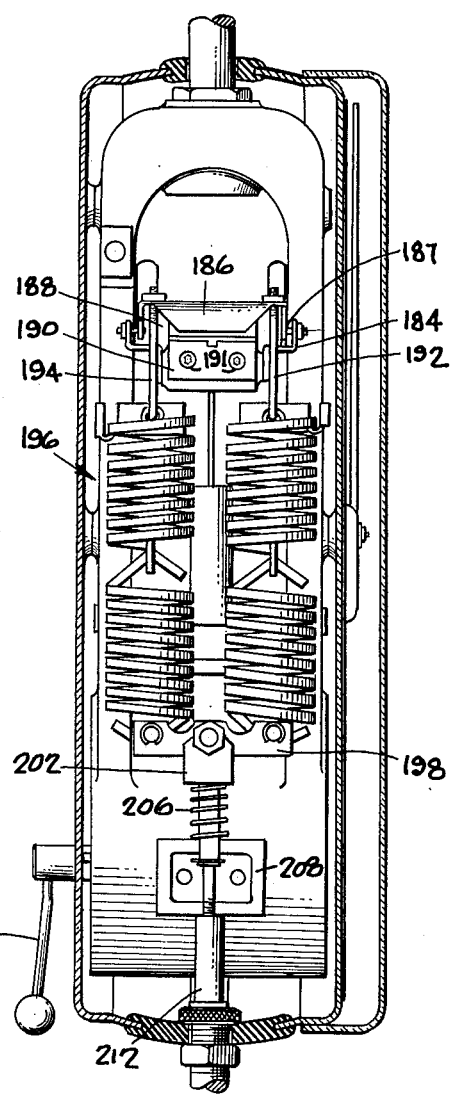
FIGURE 5 is a side elevational view of the weighing scale of FIGURE 1 of the side opposite to that of FIGURE 4, also taken along a direction within the covering structure thereof.

A dial cover 16, as more clearly shown in the views of FIGURES 4 and 5, projects outwardly from the front casing 12 and is secured at its rim end portions thereto, for example, by screws not shown. Within the dial cover 16 is disposed a dial 18 fixed against the face of the front casing 12 and provided with appropriate markings and indicia according to the particular capacity of the scale. An indicating pointer 20 is positioned for angular movement between the dial cover 16 and the dial 12 in a manner as will be more apparent as the specification proceeds.

Also shown in FIGURE 1 is a tare adjustment screw or knob 22 which extends through the front casing 12 in a convenient position for adjustment of the pointer 20 to a proper setting after a tare load is imposed. The scale unit is further provided with load carrying means in the form of a swivel hook assembly 24 coupled to the lower end thereof as shown in FIGURE 1.

Disposed within the scale unit between the opposing front and rear casings 12 and 14 is a frame generally designated by the numeral 26 as shown in FIGURE 2 which includes side plates 26a and 26b. The side plate 26a embodies tapped bosses 28 and 30 as well as a tapped opening 32 for the purpose of screwing the front casing 12 to the side plate means 26a. A similar construction, partially shown in FIGURES 4 and 5, is provided on the outer face of side plate means 26b for attachment of the rear casing 14.

Referring now to the view of FIGURE 3, there is shown (as heretofore mentioned) a sectional view taken through the center of the improved scale means of FIGURE 1 between the side plate members 26a and 26b. As seen from the views of FIGURES 3 and 1, the swivel hook assembly 24 includes a hook 34 attached to a swivel housing or bearing 36 of conventional construction. The housing 36 has additionally coupled thereto an eye member 38 which extends through an opening 40 in the cover structure, wherein the tongue and groove connection between casings is shown. The eye member 38 is in turn carried by pin 42. The pin 42 is aligned with apertures 44 and 46 (as seen in FIGURE 2) of the respective side plates 26a and 26b and is disposed in a first lever unit 48. The pin 42 is not connected to the frame 26 since it serves as a means of transmitting the load which may be carried by the hook 34 to the moving elements of the scale unit. However, in order to prevent lateral movement of the first lever 48, it is desirable that the holes 44 and 46 be tapped and screws 47 as seen in FIGURE 9, threaded therein. The screws 47 include balls as clearly shown in FIGURE 9 forming a relatively non-frictional surface to bear against the opposing ends of the pin 42 in the event the lever 48 for any reason has a tendency towards lateral swinging movement.

The lever 48 is preferably a cast member provided with a central opening or recess 50 such that the pin 42 may extend between the opposing side walls thereof for supporting the load carrying means or swivel hook assembly 24. The casting or lever 48 is further provided with a bore 52 in its right hand portion as viewed in FIGURE 3 which is adapted to receive a pin 54. The pin 54 not only extends through the lever 48, but extends into apertures 56 and 58 provided in the frame 26 as shown in FIGURE 2. Thus, the lever 48 is pivoted about the pin 52 and urged downwardly in response to a load being placed on the swivel hook assembly 24 with a lever force according to the weight of the load and the distance of pin 42 from pivot pin 54. The lever 48 is actually contoured to be nested within a cross frame 60, shown also in the view of FIGURE 2, provided for structural reasons between the side plates 26a and 26b of the frame 26.

The lever 48 has an outer end 62 with a solid flat surface for attachment of a knife means 64. The knife means 64 may be attached by means of screws 66 as shown in the view of FIGURE 4, rigidly securing the knife means 64 to the outer end 62 of the lever 48.

Referring now to the view of FIGURE 6, it will be seen the the knife means 64 coacts with a bearing means 68 carried by a lever link or C-shaped member 70. The lever link 70 is as such provided with tongues or stops 72 and 74 extending outwardly therefrom for receiving therebetween a spring clip means 76.

The lever link 70 carries in its upper end portion a bearing means 78 of identical construction to the bearing means 68 except in reverse position which is adapted to co-operate with a knife means 80 carried by a first reducing lever 82, as seen in FIGURE 3.

Before proceeding with a further description of the reducing lever 82 and other parts of the scale, it is believed that certain details of the lever link 70 and its cooperation with the respective knife members 64, 80 and bearing members 68, 78 should be explained since the co-action of these elements forms an important part of the present invention.

As will be seen from the view of FIGURE 7, the bearing member 68 is provided with a notch 83a in its bottom portion whereby the bearing means 68 is positioned over the lower portion of the lever link 70 as viewed in FIGURE 6. The bottom surface of the notch surface 83a is flat; however, the co-operating portion of the lever link 70 is radiused such that the bearing means 68 may angularly adjust itself by limited movement thereof with respect to the supporting portion of the lever link 70. Towards this end, the width of the notch 83a is slightly greater than the thickness of the lever link 70. This construction is shown most clearly in FIGURE 6a and the notch 83a is shown in cooperation with the radiused edge 70a of the link 70.

In order to provide self alignment between the bearing means 68 and the knife 64, a notch 83b is provided in the knife edge portion of the knife 64 which co-operates with a pin 83c projecting from the bearing surface of the bearing means 68. The pin 83c has a diameter slightly less than the width of the notch 83b to thereby enable but limit longitudinal movement of the knife 64 relative to the bearing means 68. The bearing means 68 is also provided with a radiused contour in its bearing surface 83d enabling the knife 64 to readily angulate itself with respect to the bearing surface 83d. These self aligning features relating to the alignment of the bearing means to the lever link as well as the alignment of the respective knives to the bearings form an improvement of the present invention.

The stop members 72 and 74 merely form an indexing structure for positioning the spring clip means 76 positively between the inner surfaces of the opposing knife members 64 and 80. The spring clip means 76 includes an outer right angular portion 76a and an inner right angular portion 76b sprung into position about the width of the lever link 70 so as firmly to be retained thereon. The spring clip means 76 extends inwardly a sufficient distance to be positioned between the knife member 64 and 80 such that the knives and more particularly the edges thereof cannot hang out of the respective bearings 68 and 78.

While the first lever 48 is preferably of a cast construction, the first reducing lever 82, previously identified, is preferably formed of two spaced side members 84 and 86. The knife means 80, as seen in FIGURE 6, is provided with opposing fingers 88 and 90 adapted to be selectively positioned in slots 92, for example, formed in the opposing side members 84 and 86. The side members 84 and 86 may be clearly seen in the view of FIGURE 4 although the slots 92 are seen only in one of the side members 84 in reference to FIGURE 3.

It should be mentioned at this point that the scale unit of the present invention embodies four levers in series, the first and last of these levers being referred to as the "first" and "second" levers, while the interposed levers are referred to as the "first" and "second reducing" levers.

Referring again to FIGURES 3 and 4, the side members 84 and 86 are pivotably coupled together about a pin 94 which extends through apertures 96 and 98 provided in opposing side plates 26a and 26b of the frame 26, as shown in FIGURE 2.

In order to prevent possible bending or strain of the lever link 70, a link strip 100 joins together opposing ends of the C-shaped lever link 70, the lever link strip 100 being merely an elongated member screwed to the opposing ends of the lever link 70 or otherwise rigidly secured thereto.

The inner end of the first reducing lever 82 is further provided with a knife member 102 (of identical construction to the knife member 80 except in reverse position) which similarly extends between notches 92 provided in the opposing side members 84 and 86. A bearing member 104 of identical construction to bearing members 68 and 78 co-operates with knife member 102 and is coupled thereto by a lever link 106. At its other end the lever link 106 carries a bearing means 108 co-operating with a knife 110 carried by the second reducing lever 112. Again, the bearing means 108 and knife 110 co-operate in a similar manner described in conjunction with FIGURES 6 and 7.

Furthermore, the construction of the second reducing lever 112, from at least a functional standpoint, is similar to that of the first reducing lever 82 wherein two opposing spaced plate members are employed with the knife member 110 extending therebetween and coupled thereto with the opposing fingers provided thereon.

A pin 114 extends between the opposing side members of the lever 112 and is pivotably mounted in openings 116 and 118 provided in opposing side plates 26a and 26b of the frame 26, as shown in FIGURE 2. The second reducing lever 112 may be provided with a plurality of slots 120 in a similar manner as the first reducing lever 84 for the purpose of receiving the opposing fingers of the knife member 110. The purpose in providing a plurality of slots is to accommodate different positionings of the lever link 160 between the first reducing lever 84 and the second reducing lever 112 as will be hereafter explained in conjunction with the operation of the improved weighing scale of the present invention.

At its outer end the second reducing lever 132 carries a knife member 122 extending between opposing slots 120 of the spaced side members of the lever and co-operating with a bearing 124 carried by a lever link 126. The lever link 126 also carries an upper bearing 128, as seen in the view of FIGURE 3, which co-operates with another knife member 130 carried by a second lever 132. Again the co-operation between the respective bearings and knife members as well as the structure thereof is similar to that of the respective bearings and knife members described in conjunction with FIGURES 6 and 7.

The second lever 132 is pivoted about a pin 134 extending therethrough into holes 136 and 138 provided in the respective side plates 26a and 26b of frame 26 as shown in FIGURE 2.

The second lever 132 is preferably formed of an integral cast construction and is provided with a bifurcated end portion 140 where it is pivoted about pin 134, a central body portion 142, and an opposite bifurcated end portion 144. Within the central body portion 142 is provided an adjusting pin 146 slidably received in a chamber 148.

The adjusting pin 146 includes an enlarged end portion 150 which retains spring means 152 positioned within the chamber 150 to urge the adjusting pin 146 towards the left, as viewed in FIGURE 3. The adjusting pin 146 further includes a threaded end 154 on which is coupled an adjusting nut 156. Thus, by opposing rotations of the nut 156, the adjusting pin 146 may be moved inwardly or outwardly of the chamber 148, although the adjusting pin 146 will always be biased towards its inner-most position. A set screw 157 may be provided for securely locking the adjusting pin in any given position.

A stirrup-like bracket 158 is coupled to the outer end of the threaded portion 154 of the adjusting pin 146. The stirrup bracket 158 carries a rack support arm 160, which in turn has coupled to its lower end an arcuately shaped gear rack 162 adapted to drive a pinion member 164. The pinion member 164 is journaled in an opening 165 (see FIGURE 2) in the side plate 26a and a corresponding opening in the side plate 26b (not shown) for driving connection in a conventional manner to the indicator pointer 20 previously described.

The gear rack 162 may be guided in its radial movement as it engages the pinion 164 by a guide roller 166, as more clearly shown in the view of FIGURE 8. Guide roller 166 includes an eccentrically mounted screw 167 extending through the inner portion thereof which may be mounted and locked by a nut in an appropriate opening provided in the side plate 26a of the frame 26, again as seen in FIGURE 2. It will be clear that by properly mounting the screw 167 within the guide roller 166 that the guide roller 166 may be designed to have a radius of curvature conforming to the radius of curvature of the gear rack 162 in order to properly keep the gear rack member 162 in positive driving engagement with the pinion member 164, the latter being connected to the indicating pointer 20 as herebefore described.

In order to further assure positive engagement of the gear rack member 162 with the driving pinion 164, a bracket 168 is secured to the arm portion 160 which has coupled thereto a screw member 170 provided with a weight 172 at its outer end. Thus, the weight 172 will serve to bias the arm 160 and coupled gear rack 162 in a direction towards the pinion 164 as viewed in FIGURE 3. Of course, for this purpose the arm portion 160 is pivotably carried by the stirrup bracket 158 on the adjusting pin 146.

Another bracket 174 is coupled to the bifurcated end portion 144 of the second lever 132 and pivotably carries a dashpot piston 176 of conventional structure cooperating with a dashpot unit 177 of the usual construction. The lower end of the piston member 174 is coupled to an arm 178, the latter being rigidly secured as by screws 180 to the frame 26. For this purpose, openings 182 may be provided in the side plate member 26a as clearly shown in the view of FIGURE 2.

At the outermost end of the bifurcated end portion 144 of the second lever 132 is provided a spring coupling bracket 184 which is rigidly secured thereto. The bracket includes ears 185 extending outwardly on opposing sides therefrom. The ears 185 are provided to freely intercouple the coupling bracket 184 with a hanger bracket 186, as by the use of opposing pins 187 threadingly coupled to the ears. The pins 187 merely cooperate with apertures provided in bracket 186 to limit excessive movement of the latter.

The hanger bracket 186 has rigidly held therein a bearing member 188 (as by gluing) of identical construction to the bearing members 68 and 78 (as previously described in conjunction with FIGURES 6 and 7) adapted to co-operate with a knife member 190. The knife member 190 is connected to the outermost end surface of the second lever member 132, as by screws 191. The knife member 190 is also of similar construction to knife members previously described and more particularly knife member 64 since it is not provided with the fingers, for example, as embodied in knife member 88.

The hanger bracket 186 in turn has threadingly coupled thereto rods 192 and 194 pivotably carrying the main spring means, generally designated by the numeral 196. Thus, the rods 192 and 194 may be adjusted upwardly or downwardly to vary the tension on spring means 196. Preferably, four spring members are employed with two pairs of spring members in parallel. These spring members are desirably of a construction such that they have a straight line characteristic under varying tension. Also, preferably the spring members are unaffected by temperature changes. Such spring members are available on the market under the trade name "Iso-Elastic."

The spring means 196 is pivotably coupled at its lower end to a U-shaped bracket member 198 which is in turn coupled to pivot pin 200. The U-shaped bracket 198 is restrained against axial movement along the pin 200 by ring members 201 rigidly secured thereto. The pivot pin 200 has pivotably coupled thereto a larger U-shaped member 202 rigidly connected with a square cross-sectioned sleeve member 204. The pin 200 is, as such, axially movable by threading into one side 205 of the bracket member 202, whereby the spring means 196 may be moved axially with the pin 200.

The sleeve member 204 has disposed thereabout a spring means 206 exerting a biasing force against a guide member 208 which is rigidly secured to the side of the frame 26. The guide member 208 has an opening in its upper end, as seen in the view of FIGURE 3, to receive the sleeve member 204. The guide member 208 is provided with a pin 210 locking the sleeve member 204 against removal from the guide member 208.

The tare adjustment screw 22 has a threaded end adapted to be threaded into the inner portion of the sleeve 204, and towards this end the tare adjustment screw 22 threadedly extends through the guide member 208. Another pin 213 limits downward threading of screw 22. The function of the tare adjustment screw 22 and its operation will be more clearly understood upon a description of the operation of the improved weighing scale of the present invention.

In a preferred form of the invention, opposing apertures 216 and 218 are additionally provided in the respective side plates 26a and 26b as shown in FIGURE 2 for the purpose of receiving a safety rod member 220 seen in the view of FIGURE 3, but more clearly shown in the view of FIGURE 10. The safety rod member 220 extends outwardly through the back of the back cover 14, as clearly shown in the view of FIGURE 4, and has coupled thereto a locking lever 222.

An extension member 224 is coupled to the first lever member 48 as by a screw means 226, again referring to the view of FIGURE 10. An adjustment screw 228 extends through the extension member 224 to a position underlying the rod member 220. The rod member 220 is provided with a flat chord surface 230 normally disposed immediately above the outer end of the adjustment screw 228 and spaced a slight distance therefrom. When it is desired to lock the scale, the lever 22 is rotated 180 degrees so as to place the full radius of the rod 220 against the adjusting screw 228, thereby urging the screw 228 and coupled lever 48 downwardly. In order to positively limit movement of the rod 220 in opposite angular directions, a limit arm 232 is coupled to the rod 220 to co-operate with pins 234 and 236 projecting from frame 26.

At the same time that the rod 220 is rotated into its locked position of engagement with the adjusting screw 228, a link 238 connected to the rod 220 is pulled downwardly to in turn rotate an arm 240 pivotably coupled at 242 to the frame 26, and more particularly the back side plate 26b thereof. The arm 240 is biased towards its normal solid line position of FIGURE 10 by a spring member 244 coupled to the arm 178 of dashpot unit 177, for example. As the arm 240 is moved, it engages a pin 248 extending from the second lever 132 and more particularly the outer bifurcated portion 144 thereof, whereby the arm moves into the dotted line position indicated.

Thus, as a consequence of moving the rod 220 through an arc of 180 degrees by actuation of the locking lever 222, not only is the first lever member 48 loaded in a downward direction by the rod 220, but the last lever 132 is also secured and actuated downwardly by co-operating movement of the pivot arm 240 engaging the pin 248 extending therefrom. As a consequence, all levers within the scale unit are locked against movement.

It should be noted that as soon as the arcuate portion of the rod 220 engages the screw 228 a constant load is imposed on the lever 48. This load tends to urge the last lever or second lever 132 upwardly; however, the arm 240 urges lever 132 downwardly as soon as it engages pin 248, thus placing all levers under tension.

As heretofore mentioned, the last lever or second lever 132, as it has been previously referred to, also includes extending through its bifurcated end portion 144 a pin 250. The pin 250 has coupled thereto one end of a spring means 252. The other end of the spring means 252 is coupled to another pin 254 which may be coupled between openings 256 and 258 provided in the frame 26. Preferably, the pins 250 and 254 have a contour defining a knife surface such that the spring end portions may, respectively, be aligned with these pins with a minimum of friction. As clearly seen in the view of FIGURE 3, the spring means 252 is of such length and at such an angle relative to the spring means 196 that it will exert a constant force balancing the last lever regardless of whether or not the scale is in a loaded or unloaded condition.

The operation of the improved scale unit of the present invention may now be described.

Generally speaking, the principle of operation is to emloy a plurality of levers in series with pivot points or fulcrums thereof, respectively, positioned in order to sufficiently reduce the actual load into a quantity capable of precise and accurate measurement. Thus, the actual load placed on the hook 34 will be transmitted to the knife 64 in a ratio of one to four in view of the distance of the knife 64 from the pivot pin or fulcrum 54 relative to the distance of the pin 42 from the fulcrum 54. On the other hand, the ratio employed in the second lever or last lever in series 132 is preferably of the order of five to one. Since levers 48 and 132 are employed in all scale units, regardless of capacity, these levers as such will effect a reduction in the load of 20 to 1.

In order to make the scale adaptable to different capacities, however, it is necessary to provide some means of changing the force ratio. In part, the ratio is changed by the positioning of lever link 106 in different locations relative to the pivot point of the first reducing lever 82 and the second reducing lever 112. For this reason, a plurality of slots 92 and 120 are provided in the opposing sides of these respective levers.

For example, in the view of FIGURE 3, the lever link 106 is positioned for use with a relatively high capacity scale such that nearly a maximum reduction of force occurs through the use of levers 82 and 112. With smaller capacity scales, the lever link 106 would be moved to the left as viewed in FIGURE 3 such that it would be closer to the pivot point 94 of lever 82 and further from the pivot point 114 of lever 112.

Once the lever link 106 has been properly set for the particular scale capacity, the scale may then be calibrated. Preferably, the pinion 164 has ten teeth; similarly, the dial 18 has ten large increments. If course, in accordance with conventional practice, it is desirable that the pointer 20 be constructed so as to be in equilibrium regardless of its angular position.

In the calibration process, the first step is to rotate the eccentric roller 166 to a location such that it is not positioned close to the gear rack 162. Thus, the eccentric roller 166 is normally positioned with its eccentricity such that the periphery thereof is spaced only a few thousandths of an inch from the inner radius of the rack 162 assuring continuous engagement of the rack 162 with the pinion 164 with appreciably no friction. The nut (not shown) which may be used to lock the screw 167 against rotation is loosened so as to permit the screw 167 to rotate and enable the roller 166 to be moved to position out of engagement with the rack 162. Thereafter, the pointer or indicator 20 is moved separately about the ten incremental divisions of the dial 18 to see if the movement of the gear rack corresponds with a similar equal tooth movement. If not, the dial as such is positioned such that conformance occurs. The guide roller 166 is then again locked in position by tightening of the nut threaded to the screw 167.

After this adjustment has been made, the pointer 20 is set at zero on the dial 18 by adjusting the tare screw 22. It will be appreciated that as the tare screw 22 is threaded inwardly or outwardly relative to the sleeve 204, the tension in the spring means 196 will be correspondingly either increased or decreased. Also in response to an increased or decreased tension on the spring means 196, the second lever or last in series of levers 132 will be moved downwardly or upwardly with a corresponding movement of the gear rack 162 and coupled pointer 120.

Thereafter, a half capacity load is hung on the hook 34 and the level of the second lever 132 is checked. If this lever in not level, then threaded rods 190 and 192 are adjusted.

After the zero setting and the half capacity adjustment has been made, full capacity load is hung on the hook 34 and the pivot point for the gear rack 162 is adjusted by moving the bracket 158 inwardly or outwardly by threading or unthreading of the adjustment screw 156 to make certain 360° rotation of the pointer occurs. After this adjustment has been made, a curve is made for various incremental readings of the scale. In order to compensate for minor variations, the bracket 198 is moved axially by threading of pin 200 into bracket 202, that is, side 205 thereof. The movement of the bracket 198 will in turn displace the center line of the spring means 196 relative to the center line of the last lever 132 so as to effect a minor variation in the readings. Normally, the center line of the spring means 196 is at right angles to the center line of the last lever 132 at one-half capacity load.

After these adjustments have been made, the scale is ready for operation. Upon placement of a load on a hook 34, the knife edge 64 will be urged downwardly into contact with the bearing means 68 to in turn transmit through the lever link 70 to a downward force through the bearing means 78 on the knife 80. Thereafter, the force is transmitted through lever 82 to the knife 102 downwardly onto the bearing means 104 to the lever link 106 to the bearing means 108 against knife 110. Similarly, the force is transmitted through lever 112 to knife means 122 against bearing 124, and then through lever link 126 to bearing 128 against knife 130.

The final reduced load effects a pivoting of the last lever 132 about pivot point or pin 134 to effect a slight raising of the knife 190 against the bearing 188 carried by the hanger bracket 186 coupled to the spring means 196.

Of course, as heretofore explained, as the movement of the lever 132 occurs, gear rack 162 carried thereby will engage and rotate the pinion 164, and of course, the dashpot assembly 174 will be actuated.

In the event a tare load is involved, it is merely necessary to set the tare screw adjustment 22 to revolve the pointer 20 back to zero before the actual load measurement is taken.

It should additionally be pointed out that the rod 220 serves the important function of a safety member preventing inadvertent damage to the scale unit as a result of overloading. In this regard, the rod 220 will limit downward movement of the first lever 48 with loads up to five times the full capacity of the scale.

Although the tare adjustment screw 22 has been shown as protruding through the bottom of the scale for convenient manual adjustment, it will be appreciated that it may be terminated within the casing as a conventional screw head to confrom with statutory requirements in a particular jurisdiction. Also, in conjunction with tare loads, it is desirable that the spring means 196 have an overcapacity rating, whereby for example ⅕ of the spring capacity will suffice for counter balancing the scale and ⅕ of the spring capacity or 20% may be used for tare adjustment purposes.

From the foregoing, it will be apparent that applicant has provided a weighing scale of rugged, and yet extremely accurate, precise, and safe construction. A production model has been found to yield accuracies of .05 of 1% and fully conforms with specifications as set forth in handbook H44 of the National Bureau of Standards.

It will be appreciated, nevertheless that certain minor changes and modifications may be made in the weighing scale of the present invention without departing from the spirit and scope thereof as set forth in the following claims.

What is claimed is:

1. A weighing scale comprising: a frame; suspension means coupled to said frame; indicating means journaled in said frame; a plurality of levers inter-coupled in series to each other and in coupled pivotable relationship, respectively, to said frame; load carrying means suspended from the first in series of said levers; spring means coupled between said frame and the last in series of said levers, said spring means biasing said last in series of said levers against movement responsive to said load; an arm depending from said last in series of said levers, said arm having a portion thereof designed for driving engagement with said indicating means; and, an auxiliary spring member inter-coupled between said last in series of said levers and said frame, said auxiliary spring member being of such length and being positioned at such an angle to said spring means as to exert a substantially constant force counter-balancing the unbalanced weight of said last in series of said levers, during both a loaded and unloaded condition of said scale.

2. A weighing scale comprising: a frame; suspension means coupled to said frame; indicating means journaled in said frame; a plurality of levers inter-coupled in series to each other and in coupled pivotable relationship, respectively, to said frame; load carrying means suspended from the first in series of said levers; spring means coupled between said frame and the last in series of said levers, said spring means biasing said last in series of said levers against movement responsive to said load; and, locking means movably coupled to said frame, said locking means including a first portion designed to actuate said first in series of said levers in a load responsive direction, and said locking means including another portion designed for coupling to said last in series of said levers to limit movement of said last in series of said levers in a load responsive direction, whereby said first in series of said levers and said last in series of said levers, as well as the levers inter-coupled therebetween, may be placed in tension.

3. A weighing scale comprising: a frame; suspension means coupled to said frame; indicating means journaled in said frame; a plurality of levers inter-coupled in series to each other and in coupled pivotable relationship, respectively, to said frame; load carrying means suspended from the first in series of said levers; spring means coupled between said frame and the last in series of said levers, said spring means biasing said last in series of said levers against movement responsive to said load; locking means movably coupled to said frame, said locking means having a first portion adapted to effect movement of said first lever means in a load responsive direction, said locking means having another portion to be coupled to said last in series of said levers to limit movement thereof in a load responsive direction, said first portion comprising a rotatable rod having a cut away section to define a flat surface portion, said flat surface portion normally being positioned with a slight spacing from said first lever means, said rod being rotatable such that the normal radiused surface thereof engages said first lever means to actuate said first lever means in a load responsive direction.

4. In weighing scale including a frame having at least two levers, respectively, coupled thereto, means co-operatively inter-coupling said levers comprising: a knife member rigidly secured to one end portion of each of said levers; a C-shaped member having opposing inner radiused bearing surface portions designed to engage, respectively, each said knife member; and, clip means receivable over the body of said C-shaped member and extending in between said knife members so as to limit longitudinal movement of said C-shaped member, whereby said C-shaped member is locked in a longitudinal direction so as to prevent hanging out of said C-shaped member with respect to said bearing members.

5. In a weighing scale including a frame having at least two levers, respectively, coupled thereto, means co-operatively inter-coupling said levers comprising: a knife member rigidly secured to one end portion of each of said levers; a C-shaped member having opposing radiused end portions; a bearing member mounted for limited pivotable movement on each said opposing end portion of said C-shaped member, said bearing member defining a notch slightly wider than said opposing end portion, said notch having a flat bottom surface for cooperation with said radiused portion, and said bearing member being mounted such that said notch straddles said opposing end portion with said flat bottom surface engaging said radiused end portion whereby said flat surface enables pivotable movement of said bearing member with respect to said end portion and said slightly wider width of said notch limits lateral movement of said bearing member with respect to said end portion; each said bearing member being designed to engage, respectively, each said knife member; and, cooperative means on each cooperating knife member and bearing member limiting relative lateral movement therebetween.

6. The combination, according to claim 5, in which said cooperative means comprises a pin protruding from the knife engaging surface of said bearing member and a notch provided in the knife edge designed to receive said pin, said pin being characterized by a slightly less diameter than the width of said notch to enable limited movement of said bearing member in said notch of said knife member.

References Cited in the file of this patent
UNITED STATES PATENTS

| | | |
|---|---|---|
| 458,322 | Stuart | Aug. 25, 1891 |
| 606,529 | Finn | June 28, 1898 |
| 1,017,596 | Sabin et al. | Feb. 13, 1912 |
| 1,548,321 | Jaenichen | Aug. 4, 1925 |
| 1,576,948 | Cameron | Mar. 16, 1926 |
| 1,785,382 | Hurt | Dec. 16, 1930 |
| 1,825,336 | Cross | Sept. 29, 1931 |
| 2,244,621 | Hurt | June 3, 1941 |
| 2,731,255 | Stelzer | Jan. 17, 1956 |
| 2,832,582 | Plaas | Apr. 29, 1958 |